UNITED STATES PATENT OFFICE.

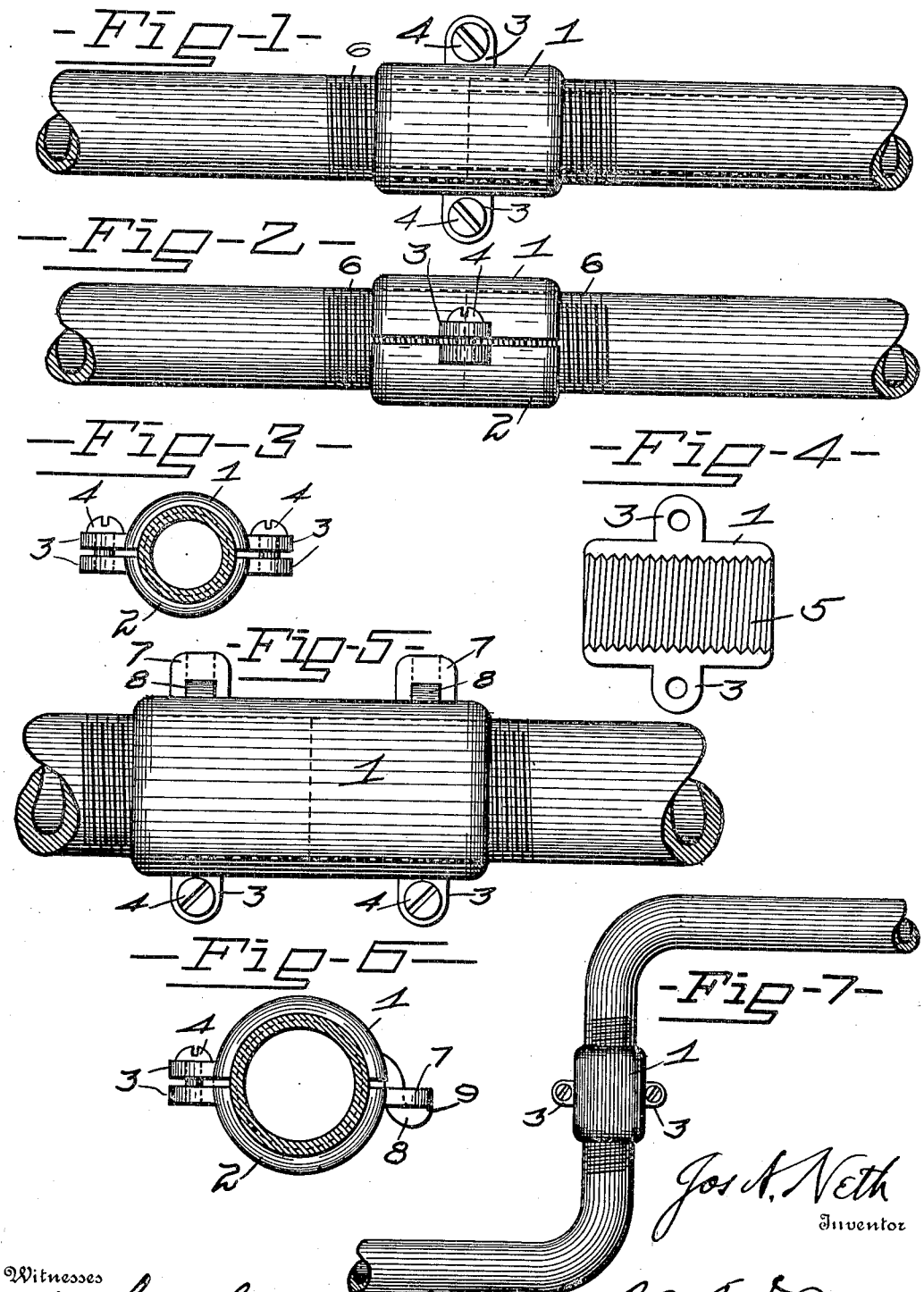

JOSEPH A. NETH, OF DAYTON, OHIO.

COUPLING FOR ELECTRICAL CONDUITS.

No. 849,417.      Specification of Letters Patent.      Patented April 9, 1907.

Application filed December 16, 1905. Serial No. 291,963.

*To all whom it may concern:*

Be it known that I, JOSEPH A. NETH, a citizen of the United States, residing at Dayton, in the county of Montgomery and State of Ohio, have invented certain new and useful Improvements in Couplings for Electrical Conduits; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in couplings for conduits of the form used throughout the interior of buildings for running the wires or electrical conductors.

The object of the invention is to provide a coupling which may be placed in the most restricted and inaccessible places for connecting the ends of a conduit.

At the present time conduits known as "iron-armored" conduits are compelled to be employed, owing to the demands of The National Board of Fire Underwriters. Owing to these demands, the question of a suitable coupling has become one of importance, owing to the many out-of-the-way places where couplings must be employed. The usual elbow, T, and running thread-coupling employed by gas-fitters are unsuitable for the employment of couplings, owing to the necessity of the use of a wrench in making the connections. In using the ordinary coupling common to gas-fitters the adjacent ends of the conduit must be provided with what is known as "running-threads" in order that the coupling may be run back upon one section of the pipe in order to make the connection and then replaced over the joint. The cutting of these running-threads offers a serious objection for two reasons. First, it entails unnecessary time and labor to extend the threads a suitable distance away from the end of the pipe or conduit, and, secondly, it weakens the conduit to an undesirable extent, and consequently endangers the pipe. In other words, owing to the necessity of extending the threads along the pipe or conduit any undue strain placed thereon is apt to break the same. This is a common occurrence and is well known to persons whose business it is to perform this class of electrical construction work. With the present coupling these objections are entirely overcome, and the work of coupling the ends of a conduit in the most inaccessible places is reduced to a minimum.

Preceding a detailed description of my invention reference is made to the accompanying drawings, of which—

Figure 1 is a top plan view of my improved coupling for conduits, showing the same coupling the ends of sections of a conduit. Fig. 2 is a side view of the same. Fig. 3 is a sectional view through the coupling and conduit. Fig. 4 is a detail view of one of the parts of a coupling. Fig. 5 is a view similar to Fig. 1, showing a coupling adapted to the larger sizes of conduits. Fig. 6 is a sectional view of the coupling as shown in Fig. 5. Fig. 7 is a view illustrating the application of my improved coupling to a conduit having a double bend.

In a detail description of the invention similar reference characters indicate corresponding parts.

My improved coupling consists of a screw-threaded clamp consisting of two parts 1 and 2, which are clamped together by means of apertured ears 3 and screws 4. The interior of each part of said clamp is provided with screw-threads 5; but these screw-threads are not intended to perform the functions of the ordinary coupling. In other words, the screw-threads of the ordinary coupling are intended to engage running-threads on the pipe or conduit in order that such coupling may be run onto one section of the conduit and then back over the joint. The screw-threads 5 of the split coupling in the present case perform the single function of locking the conduit-sections in position against any outward longitudinal movement. For this reason the adjacent ends of the conduit-sections are necessarily provided with threads 6, but only a sufficient extent to enable the coupling to clamp the ends of the conduit inclosed by said coupling. The drawings show the screw-threads on the conduit-sections extended outwardly farther than is obviously necessary for the application of my coupling, and yet such threads are not extended far enough to be applicable to the usual coupling which employs running-threads on the pipe-sections for the purpose of running said coupling entirely off one section of the pipe. The two parts of the clamp are placed around the abutting ends of the conduit-sections when the latter are brought together, and when so placed they are united by means of screws 4 and are thus tightened rigidly upon the screw-threaded ends of the conduit-sections. This placing of the coupling may be done with facility even in the most out-of-way places, as the turning of a coupling or the turning of the conduit-sections is entirely obviated. It may be further stated that the conduits may be accurately brought together so that their ends will abut before placing the coupling in position. The dotted lines in the several views indicate the close connection of the adjacent ends of the conduit-sections. This is an important feature in the placing of conduits for the stringing of electrical wires, for the reason that there are no interior shoulders or obstructions to impede the free passage of the wires or conductors in passing them through the conduits.

In Fig. 5 my improved split coupling is illustrated in its application to conduits of the larger type, and in this application instead of employing the apertured ears 3 on both sides a connection is made on one side between the two parts of the coupling, which prevent said parts from becoming separated in handling the same and also obviates the necessity of employing the clamping-screws 4 on both sides. These features consist of providing the lower member or the rearward member with an apertured ear 7 and the other member with an interlocking projection 8, which penetrates the aperture in said ear 7 and engages said ear 7 after passing through the aperture, as at 9, Fig. 6.

In Fig. 7 I have illustrated my split coupling utilized for the joining of a conduit having a double bend at the coupling. It will be readily understood that such a coupling may be employed to connect the ends of a conduit regardless of the number of bends or the angle of the bends or the place or places where the conduit is placed. In placing these conduits throughout the interior of a building the party who places the same often has no choice, but is compelled to run said conduits in and out of corners and nooks where it is impossible to make a proper joint with the old style of coupling and the running-threads. Even in cases where it is barely possible to use the old style of coupling it is difficult or impossible to make a proper coupling, owing to the limited space in which to turn a wrench.

I am aware that heretofore it has been the common practice to connect hose by means of two-part clamps having plain interior surfaces or screw-threaded interior surfaces; but such clamps have been designed for the express purpose of meeting the requirements of a hose-coupler and are not adapted to the purposes of conduit or electrical pipe connections. In other words, it has heretofore been common to provide a two-part clamp with inner screw-threads, the parts being hinged together and manipulated by an extended handle with an interlocking spring, the length of such clamp being regulated by the flanges on the pipe-nipples or hose-fittings, also heretofore a two-part clamp with smooth interior surfaces and means for connecting the parts of the clamp consisting of screws penetrating extensions from the clamp members. These devices are unsuited for the purposes of my coupling and are not within the terms of the claim submitted.

Having described my invention, I claim—

In a coupling for connecting electrical conduits, an elongated coupling-clamp consisting of two parts with interior screw-threads and adapted, when in position on the ends of the conduits or pipes, to engage a portion of the threads on each pipe or conduit end and to permit the ends of the pipes or conduits to be brought in contact with each other either before or after the two-part coupling-clamp is placed in position, the said two-part coupling-clamp having means on opposite sides thereof for rigidly maintaining said coupling upon the ends of the pipes or conduits.

In testimony whereof I affix my signature in presence of two witnesses.

JOSEPH A. NETH.

Witnesses:
CAROLYN M. THEOBALD,
R. J. MCCARTY.